United States Patent [19]

Lambert

[11] Patent Number: 5,467,589
[45] Date of Patent: Nov. 21, 1995

[54] VEGETABLE HARVESTING SYSTEM

[76] Inventor: Victor S. Lambert, 702 St. John St., Boqalusa, La. 70427

[21] Appl. No.: 110,578

[22] Filed: Aug. 23, 1993

[51] Int. Cl.$^6$ ............................................. A01D 46/22
[52] U.S. Cl. ................................. 56/327.1; 56/239
[58] Field of Search ........................... 56/327.1, 331, 56/239, DIG. 17

[56] References Cited

U.S. PATENT DOCUMENTS

| | | | |
|---|---|---|---|
| 1,500,016 | 7/1924 | Trayhorn | 56/331 |
| 2,403,294 | 7/1946 | Morrell | 56/331 |
| 4,191,008 | 3/1980 | Smith | 56/327.1 |
| 4,759,174 | 7/1988 | Merritt | 56/327.2 |

*Primary Examiner*—Terry Lee Melius
*Attorney, Agent, or Firm*—C. Emmett Pugh; Pugh/Associates

[57] ABSTRACT

A vegetable harvesting device or cutter (8) for harvesting a harvest portion from a plant, e.g. okra, which plant has a harvest portion supported at the end of a stem. The cutter includes a conduit member (10) that has a passageway (12) therethrough. The passageway includes receiving and discharge ports (20 & 16) and is adapted to allow passage of a desired harvest portion and to receive a portion of the stem adjacent the harvest portion. The perimeter of the receiving port is defined by a peripheral lip located at a surface of the conduit member and has at least a functional portion lying within a plane. A hand-actuated, squeezeable severing means or cutter is in operational connection with the functional portion of the peripheral lip and is selectively responsive to an operator for harvesting the harvest portion by severing the stem while a section of the stem is received within the passageway of the conduit member (note FIG. 4). A flexible barrier means (46) of brush bristles is disposed within the receiving port at an operational distance from the peripheral lip, for allowing entrance of the harvest portion into the passageway when the harvest portion is supported by the stem and for preventing the harvest portion from exiting the passageway through the receiving port after the harvest portion has been harvested from the plant by severing the stem. A hopper means (54) is also included with a connecting channel (52) for receiving the cut okra from the device (note FIG. 5). After the user has cut the stalk and performs backward, flipping motion, the channel directs the cut harvested portion to the sack or other hopper container or hopper means.

23 Claims, 3 Drawing Sheets

VEGETABLE HARVESTING SYSTEM

TECHNICAL FIELD

The present invention relates to hand-held vegetable harvesting devices, and more particularly to a hand-held vegetable harvesting device, for, for example, harvesting okra, having a hand-actuated cutter and deflectable barrier means which is deflectable by the harvest portion of the plant when growing from and supported upon a stem but has sufficient resistive force to hold-up and support the harvested portion after it has been severed. In the preferred embodiment a hand-actuated, squeezeable cutter with laterally moveable blades is located near the bottom of the device, and a series of brush bristles are used as the flexible barrier. After the user has cut the stalk and performs a backward, flipping motion, a conduit channel directs the cut harvested portion to a sack or other container for removing the harvested vegetables from the field.

BACKGROUND ART

Many plant species, commonly cultivated as food crops, have an irritating sap and/or a coating on their exterior surface to protect the plant from various forms of predation. The presence of this irritant can make harvesting the harvest portion from such a plant an uncomfortable experience. In this context a "harvest portion" is that portion of the plant for which the plant is cultivated, along with an attached section of stem.

Okra is a typical example of the type of plant for which a device embodying the present invention is directed. The harvest portions of the okra plant consist of pods produced at the end of woody stems. The pods project upright.

The exterior surface of the leaves and pods are covered with an irritating film. The sap of the plant is also an irritant to the skin of most people. Both the film and the sap create an itchy, burning sensation in the general area in which they contact the skin surface.

The pods of the okra plant are sometimes harvested by grasping the pod and pulling it free from the plant but such typically causes damage to the pods. In order to properly harvest the pods, the attachment between the stem and the okra pod must be severed. This can be and has been accomplished in the prior art by, for example, reaching within the leafy structure of the plant, manually grasping the pod with one hand, severing the stem, with a device such as a knife or a pair of snips, held in the other, and maintaining physical control of the pod until it is deposited in a basket or other type of device suitable for holding a quantity of the harvested pods.

Severing the stem causes a droplet of sticky sap to form at the tip of the severed stem. Because of the stem's close proximity to other pods, the droplet formed can readily contact the skin of a person harvesting the remaining pods. Contact with the sap of the plant is, therefore, highly likely when harvesting a large quantity of okra pods. Additionally, reaching within the leafy structure of the plant usually results in contact between the irritating film covering the leaves and the skin surface of the person harvesting the pods. Because of the high probability of the skin contacting either the film and/or the sap during the harvesting process, protective measures need to be taken by the majority of people engaged in harvesting okra pods.

Wearing protective clothing, such as long sleeved shirts and gloves, can be an effective protective measure when the harvesting will not continue for an extended period of time. However, after an extended period of harvesting, sweat saturation of the protective clothing can create a path for the irritant to pass through to the skin surface. In order for protective clothing to offer effective protection for an extended period of time, it must provide a moisture proof barrier between the skin and the irritating film and sap. However, this is an impractical solution in the hot, humid conditions under which the plants are typically grown and harvested.

A better solution for minimizing contact between the film and/or sap is to use a harvesting device which allows the worker, at a distance from the plant, to preferably indirectly grasp the pod, sever the stem, and maintain control of the pod until it is deposited at a desired location. While this solution minimizes contact with the irritating film and sap, current methods of maintaining control of the pod after the stem is severed increase the risk of losing and/or damaging the pods during harvesting.

A current method of maintaining control of the pod after the stem is severed is severing the stem while the pod is within a containment vessel which is sealable by an extended severing blade. The severing blade, dimensioned to allow the blade to provide a barrier across the opening, maintains the pod within the containment vessel until the blade is retracted. A problem with this method is the loss of pods from the containment vessel when the blade is retracted to harvest another pod. There is nothing to prevent a pod supported by the blade from falling from the containment vessel once the blade is retracted. Since the operator may not see the pod fall or may not wish to retrieve the pod from its landing place, this can lead to the loss of available harvest portions.

Another method of maintaining control of the pod after the stem is severed uses a forked member which pierces the pod to hold it in place during the stem severing process. The fork remains in place until the pod is released at the desired location. This piercing damages the pod and renders the pod unsuitable for sale in markets.

Although the use of harvesting devices is a better method than wearing protective clothing when harvesting for an extended period of time, their use can increase damage to and loss of available harvest portions.

It is desirable, therefore, to have a harvesting apparatus which will maintain control of the harvest portion after the stem is severed without piercing the harvest portion or temporarily blocking its exit from the containment vessel by an intermittent barrier.

DESCRIPTION OF THE PRIOR ART

A list of prior patents which may be of interest is provided below:

| U.S. Pat. No. | Inventor | Issue Date |
| --- | --- | --- |
| 4,191,008 | Archie O. Smith | March 4, 1980 |
| 4,759,174 | Oswell F. Merritt | July 26, 1988 |

These two prior patents are directed to okra harvesters. However, as may be discerned by a review of these above patents, the prior art does not teach nor suggest the use of a deflectable barrier means to control the harvest portion after it is severed from the stem or fairly suggest or teach other important features found in the present invention.

Foe example, U.S. Pat. No. 4,191,008, issued Mar. 4, 1980, to Archie O. Smith, discloses an "Apparatus For harvesting Okra or the Like". The apparatus includes an elongated frame having a handle at one end and a cutter member mounted on the opposite end. A trigger is provided at the handle for remotely operating the cutter and a shroud partially surrounds the handle to protect the hand of the user. A cylindrical guide member is provided for retaining the pod in position while the stem is severed. A set of prongs carried by the cutting member pierces the pod during the cutting stroke and the pod is automatically released during retraction, for disposal into a separate collection receptacle.

Another example of prior art harvesting devices is U.S. Pat. No. 4,759,174, dated Jul. 26, 1988, to Oswell F. Merritt, which discloses a "Vegetable Harvesting Apparatus". The harvesting apparatus is characterized by a generally triangular shaped hopper having a cutting opening provided therein, a blade slidably mounted in the hopper and a handle attached to the opposite end of the hopper from the cutting opening, with a pivoting lever mounted in the handle and a blade rod connecting the upper end of the pivoting lever to the blade. The harvesting apparatus is utilized by extending a vegetable such as a pod of okra through the opening in the front portion of the hopper and forcing the blade against the pod stem by manipulating the rod lever with the hand, to sever the stem and collect the okra pod in the hopper.

GENERAL DISCUSSION OF INVENTION

It is therefore an object of the present invention is to provide a device for harvesting a harvest portion from a plant which produces a harvest portion upon a stem, such as, for example, okra, and which will minimize damage to the harvest portion during the harvesting process.

Another object of the present invention is to provide a harvesting device that will allow the operator to visually verify the position of the harvest portion within the harvesting device prior to severing the stem.

It is still a further object of the present invention to provide a harvesting device which includes a flexible barrier or support means which will allow the harvest portion to be inserted into the harvesting device through a receiving, entrance port while attached to the stem, but will not allow a harvest portion to exit the harvesting device under, for example, its own weight through the entrance port after the stem is severed.

Accordingly, a vegetable harvesting apparatus for harvesting a harvest portion from a plant which forms a harvest portion supported at the end of a stem, such as particularly okra, is described. The apparatus comprises a conduit member that has a passageway therethrough going from a proximal end portion to a distal end portion. The passageway includes receiving or entrance and discharge ports at its proximal and distal portions, respectively, and is adapted to allow passage of a desired harvest portion and to receive a portion of the stem adjacent the harvest portion.

The perimeter of the entrance port is defined by a peripheral lip located at a surface of the conduit member and has at least a functional portion lying within a plane. A severing means, which is laterally moveable preferably by a hand-squeezing action across the width of the entrance port, is in operational connection with the functional portion of the peripheral lip and is selectively responsive to an operator, for harvesting the harvest portion by severing the stem while a section of the stem is received within the passageway of the conduit member.

A flexible barrier or support means, serving as flexible entry cover means preferably in the form of juxtaposed sets of flexible brush bristles, is disposed within the receiving port at an operational distance from the peripheral lip, for allowing easy entrance of the harvest portion into the passageway when the harvest portion is supported by the stem but for preventing the harvest portion from exiting the passageway back out through the receiving port under its own weight after the harvest portion has been harvested from the plant by severing the stem.

After the harvest portion has been severed from the stem, the operator merely, for example, flips the device up and back, causing the severed harvest portion to move from its severed position at the entrance end of the device to the distal, discharge end for ultimate collection and removal of the harvested portions from the field.

The body of the device is preferably made of plastic and preferably is transparent.

Although a hand-tool is currently considered the preferred embodiment, the principles of the invention can be applied to an automated, mechanized device, if so desired.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

DETAILED DESCRIPTION OF THE PREFERRED EXEMPLARY EMBODIMENT

Figure 1:
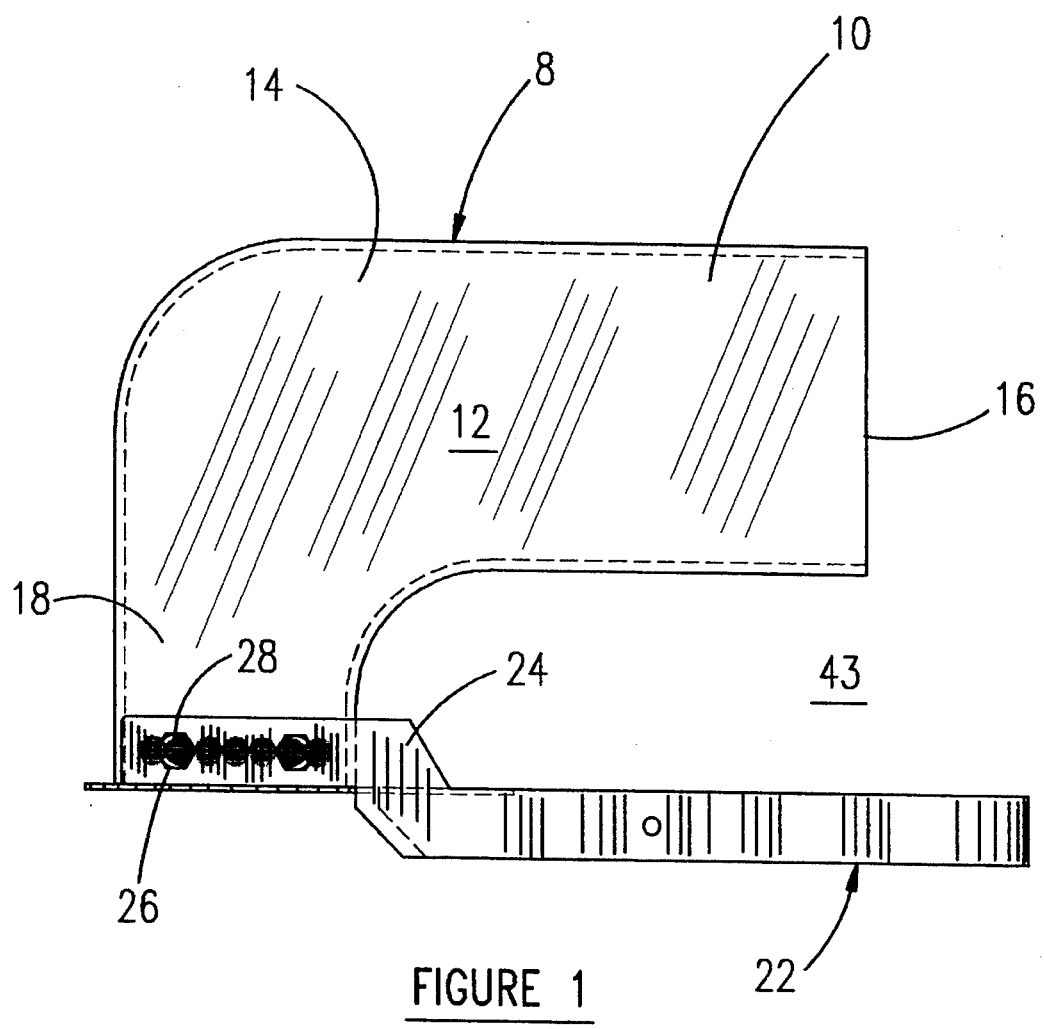
FIG. 1 is a side view of a preferred embodiment of the present invention illustrating a preferred transparent, L-shaped conduit member and attachment of a preferred handle means to the conduit member.
Figure 2:
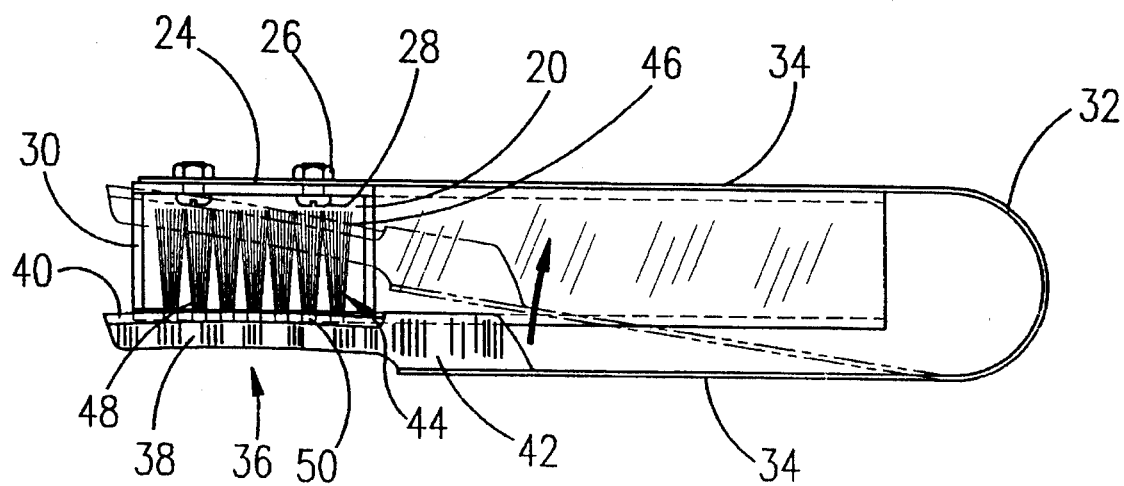
FIG. 2 is a bottom view showing the underside of the preferred embodiment illustrated in FIG. 1 and shows a preferred, flexible barrier means made of brush bristles disposed within a preferably rectangularly-shaped, receiving, entrance port and operation of a preferred, laterally moveable, hand actuated, severing means.
Figure 3:
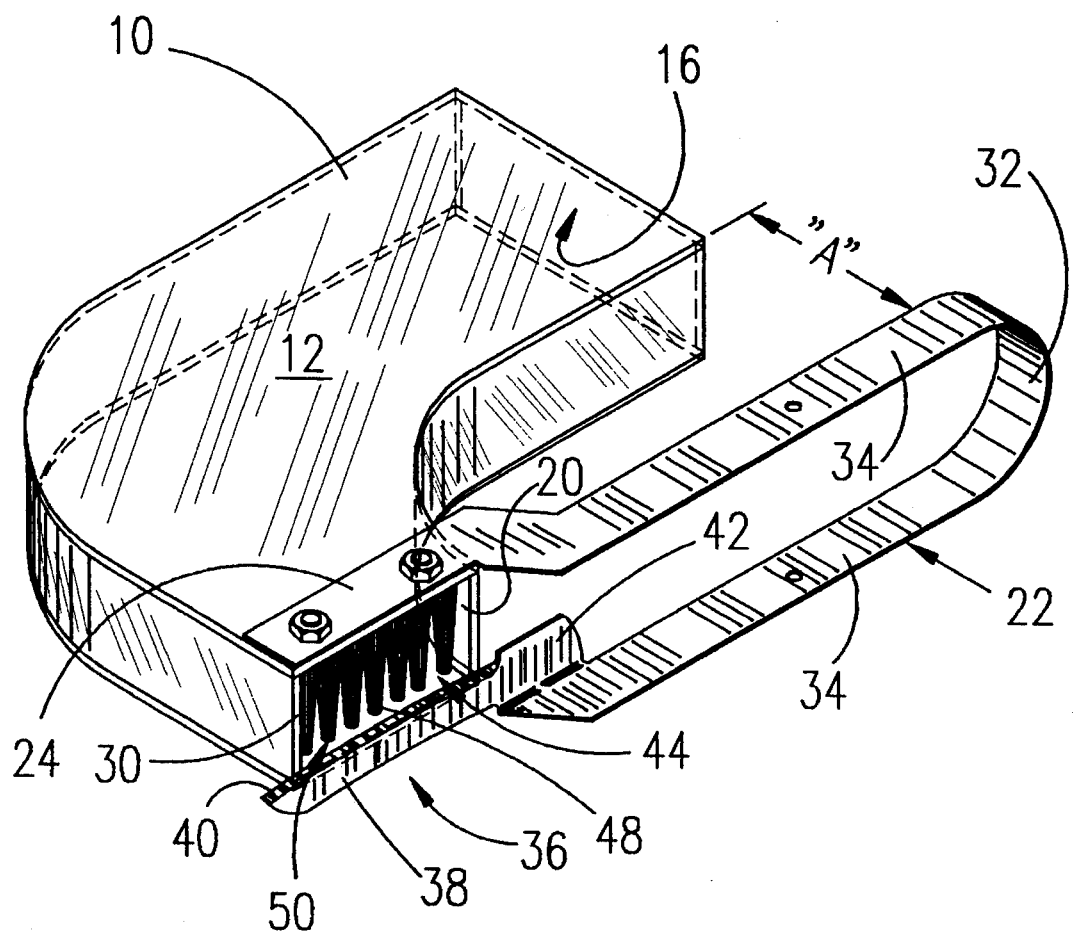
FIG. 3 is a perspective view of the preferred embodiment of FIG. 1 which more clearly depicts the attachment of a preferred severing means to the handle means and the spacial relationship of the severing means with respect to the receiving port.

FIGS. 1, 2 & 3, illustrate an exemplary, preferred embodiment of the harvesting device of the present invention, generally indicated by the numeral 8 and particularly as applied to the hand-harvesting of okra. FIG. 1 is a side view of the device and shows the preferred transparent, L-shaped conduit member, generally indicated by the numeral 10. In this preferred embodiment conduit member 10 is constructed of, for example, one-eighth-inch (⅛") thick, clear plexiglass.

A passageway, generally indicated by the numeral 12, is provided within conduit member 10. In this embodiment the dimensions of the side surface 11 of the conduit member 10 is for example, about three and one quarter (~3.25") inches wide at the longer end 14 where the discharge port 16 is located, and for example, about two and one quarter (~2.25) inches wide at the shorter end 18, where the receiving port 20 is located.

The width "W" of conduit member 10, as shown in FIG. 2, is, for example, about one and one-quarter (~1.25") inches. In this embodiment, receiving port 20 is a preferred rectangular shape having internal dimensions sufficient to allow receipt therethrough of the desired harvest portion. In the illustrated embodiment the dimensions are, for example, about one inch by three inches (~1"×3").

FIG. 1 also shows a preferred handle means, generally indicated by the numeral 22, and shows the connection of attachment member 24 to the conduit member 10. The handle attachment member 24 is secured to the exterior of peripheral lip 30 by any connecting hardware which will form a rigid connection. In this preferred embodiment nuts 26 and bolts 28 were selected. This connection is more readily seen in FIG. 2.

Also illustrated in FIG. 2 is a preferred U-shaped member generally indicated by the numeral 32. In this preferred embodiment U-shaped member 32 is constructed of, for example, spring steel bar-stock five-eighths (⅝") of an inch wide by, for example, one-sixteenth (1/16") of an inch thick having sufficient resilience to allow the tips of end sections 34 to return to their original positions when urged together by an operator. In this preferred embodiment, the attachment member 24 is rigidly secured to an end section 34 by welding the two together in the configuration shown in FIGS. 1 and 3.

A preferred severing means, generally indicated by the numeral 36, is also illustrated in FIG. 2. As shown, the preferred severing means 36 includes a blade member 38 which is provided with an edge 40. The length of edge 40 is larger than the greatest dimension of receiving port 20 to allow the edge 40 to contact and sever a stem which intersects the plane formed by the functional portion of peripheral lip 30. The "functional portion" means that portion of the lip which in combination with the severing means allows the stem to be severed.

FIG. 3 more clearly shows the connection of preferred severing means 36. As shown, the blade member 38 also includes a portion 42 at an end thereof adapted for attachment to an end section 34 of U-shaped member 32. A preferred method of attaching portion 42 to an end section 34 is welding the two together in the configuration as shown in FIG. 3.

FIGS. 1 and 3 also show gap 43 between handle means 22 and conduit member 10. Gap 43 has a sufficient width "A" to allow an operator to grasp the handle means 22. In this preferred embodiment the gap 43 is, for example, about two and one-half (~2½") inches wide. This gap should be wide enough for the user to easily grip the handle means 22 and squeeze it, causing the knife blade to move laterally across the entrance opening, severing any vegetable stems that may be present below the entry port 20.

A preferred embodiment of the barrier means, generally indicated by the numeral 44, is shown in FIGS. 2 and 3 projecting a functional distance across receiving port 20. A "functional distance" is a distance which requires a harvest portion entering receiving port 20 to contact and deflect barrier means 44.

The preferred barrier means 44 is comprised of a plurality of elongated flexible barrier members 46. A preferred, exemplary flexible barrier member 46 is a nylon bristle having sufficient resilience to allow the bristles to return to its original position after being deflected, but sufficient rigidity such that, when a selected quantity of the bristles are arranged in bundles, the bundle is capable of supporting the weight of a desired harvest portion without becoming inoperably deflected under the force of gravity on the harvested portion.

"Inoperably deflected" means deflected to such an extent that a harvest portion is allowed to exit through receiving port 20. In this embodiment the length of flexible barrier members 46 is about the width of the preferably rectangular shaped receiving port 20.

As illustrated, barrier means 44 comprises seven barrier bundles 48. Each barrier bundle 48 is composed of, for example between fifty (50) and a hundred (100) individual flexible barrier members or bristles 46. One end of each barrier bundle 48 is secured within a receiving cavity 50, adapted for receiving one end of a barrier bundle 48, located within receiving port 20 a functional distance from peripheral lip 30. A "functional distance" is a distance which will allow severing means 36 to sever the stem without causing damage to the barrier bundle 48. A preferred method of securing barrier bundles 48 within receiving cavities 50 is gluing them with a non-water-soluble glue.

In the preferred embodiment the harvesting device 8 is provided with a hopper means 52 having a holding cavity 54 which is in operable connection with discharge port 16. In operable connection means a harvest portion discharged through discharge port 16 will enter into holding cavity 54.

Figure 4:
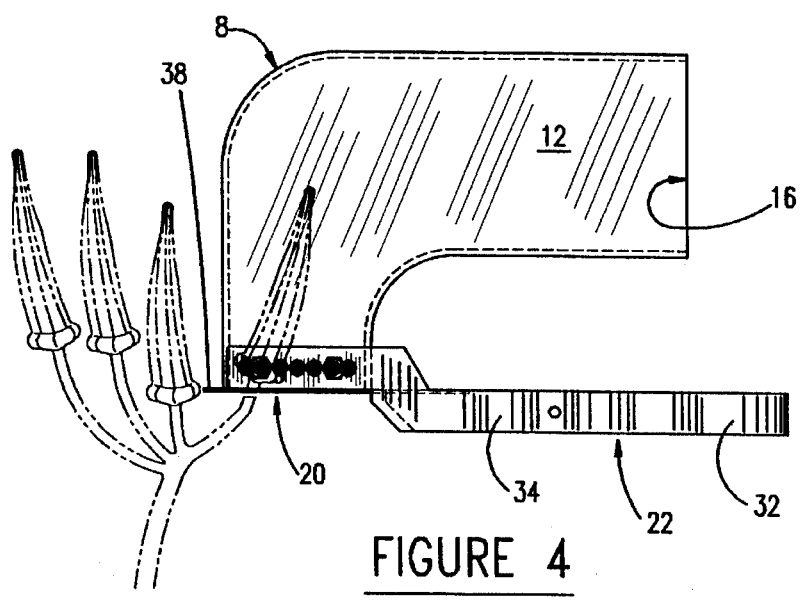
FIG. 4 is a side view of a preferred embodiment illustrated with an okra pod held in position by a preferred deflectable barrier means just after the stem is severed.
Figure 5:
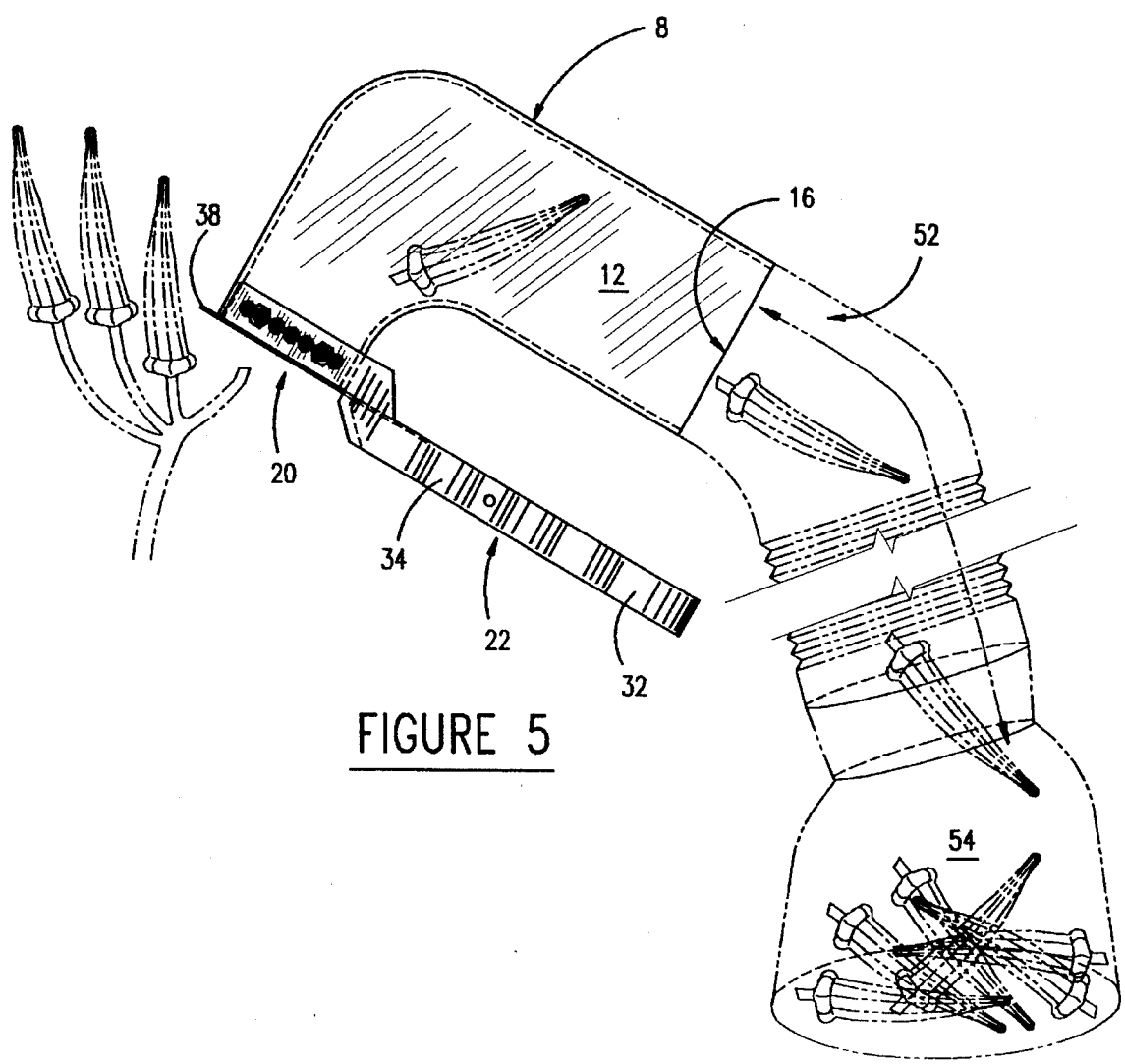
FIG. 5 is a side view illustrating the harvested okra pod passing through the passageway within the preferred transparent L-shaped conduit member and exiting via the discharge port into a hopper means.

The operation of the harvesting device is illustrated in FIGS. 4 and 5. FIG. 4 shows four pods of okra supported on stems. In operation, an operator, gripping handle means 22 in one hand, positions receiving port 20 above a desired harvest portion supported upon a stem. The receiving port 20 is then brought down until the tip section of the harvest portion contacts barrier means 44. As receiving port 20 continues downward, the brush bristles of the barrier means 44 are deflected by the harvest portion supported on the stem, allowing the harvest portion to pass into the passageway 12.

Once the harvest portion passes the barrier means 44, each resilient, flexible set of brush bristles of the barrier member 46 returns to its original position. The stem may then be severed by urging the end sections 34 of U-shaped member 32 together by the operator tightening his/her grip about the handle 22, squeezing it. This causes edge 40 of blade member 38 to travel across the plane formed by the peripheral lip 30. The cutting edge 40 contacts the stem either severing it in place or forcing the stem against peripheral lip 30 and then severing the stem in a scissor action. When the U-shaped member 32 is released blade member 38 returns to its original position due to its inherent springiness.

Since, by design, the brush bristles of the flexible barrier means 44 are not deflectable under the weight of a harvest portion, the harvest portion remains within passageway 12 until the operator tilts the harvesting device 8, for example, in the manner illustrated in FIG. 5, causing the harvest portion to be discharged from the discharge port 16 into the holding cavity 54 of hopper means 52.

Of course, many changes in the detail structure illustrated and described above are possible. For example, rather than relying solely on the biasing springiness of the handle to laterally return the knife blade to its "neutral" position, a biasing spring could be used as a supplement to or replacement of the illustrated handle. Additionally, the cutting action could be motorized using, for example, a solenoid drive in place of the operator squeezing the handle. Also, the device 8 could be rounded rather than squared off or with other right angles as illustrated, and the body portion 12 could be angled up rather than extended back parallel to the handle 22 as illustrated. Likewise, the handle 22 could be shaped to conform better to the shape of the operator's palm and hand and/or a handle cushion added.

Thus, the embodiment described herein in detail for exemplary purposes is of course subject to many different variations in structure, design, dimensions, application, and methodology. Because many varying and different embodiments may be made within the scope of the inventive concept(s) herein taught, and because many modifications may be made in the embodiments herein detailed in accordance with the descriptive requirements of the law, it is to be understood that the details herein are to be interpreted as illustrative and not in a limiting sense.

What is claimed is:

1. A vegetable harvesting device for harvesting a harvest portion from a plant having a harvest portion supported at the end of a stem, such as okra and the like, said device comprising:

a conduit member including a passageway having receiving and discharge ports therein; said passageway being adapted to allow passage therethrough of a desired harvest portion and to receive a portion of the stem adjacent the harvest portion; the perimeter of said receiving port being defined by a peripheral lip located at a surface of said conduit member having at least a functional portion lying within a plane;

severing means, in operational connection with said functional portion of said peripheral lip and selectively responsive to an operator, for harvesting the harvest portion by severing the stem while a section of the stem is received within said passageway of said conduit member; and flexible barrier means, disposed within said receiving port an operational distance from said peripheral lip, for allowing entrance of the harvest portion into said passageway when said harvest portion is supported by the stem and for preventing the harvest portion from exiting said passageway under the force of gravity through said receiving port after the harvest portion has been harvested from the plant by severing the stem;

a substantially U-shaped member constructed of a material having sufficient resilience to allow the tips of said end sections to return to their original positions after having been urged together by an operator squeezing them together; and handle means having two end sections, one of the end sections being rigidly attached to said conduit member, for allowing an operator of said harvesting device to position said receiving port about the stem of a desired harvest portion, by inserting said harvest portion into said passageway through said receiving port, such that a cross-section of the stem intersects the plane of said peripheral lip, at a distance from the hand of said operator.

2. A vegetable harvesting device for harvesting a harvest portion from a plant having a harvest portion supported at the end of a stem, such as okra and the like, said device comprising:

a conduit member including a passageway having receiving and discharge ports therein; said passageway being adapted to allow passage therethrough of a desired harvest portion and to receive a portion of the stem adjacent the harvest portion; the perimeter of said receiving port being defined by a peripheral lip located at a surface of said conduit member having at least a functional portion lying within a plane;

severing means, in operational connection with said functional portion of said peripheral lip and selectively responsive to an operator, for harvesting the harvest portion by severing the stem while a section of the stem is received within said passageway of said conduit member; and flexible barrier means, disposed within said receiving port an operational distance from said peripheral lip, for allowing entrance of the harvest portion into said passageway when said harvest portion is supported by the stem and for preventing the harvest portion from exiting said passageway under the force of gravity through said receiving port after the harvest portion has been harvested from the plant by severing the stem, said barrier means being operationally deflectable by a harvest portion supported on a stem, and wherein said barrier member is not operationally deflectable by the weight of a harvest portion.

3. The harvesting device of claim 2, wherein said barrier means comprises:

a plurality of elongated flexible barrier members having two end portions.

4. The harvesting device of claim 3, wherein:

each of said plurality of flexible barrier members is sufficiently rigid to allow said flexible barrier member to substantially retain its shape when being supported by only one said end portion, and each of said plurality of flexible barrier members, is fixedly attached within said inner peripheral lip of said receiving port such that the other said end portion projects a functional distance across said receiving port.

5. The harvesting device of claim 4, wherein:

said receiving port is substantially rectangular in shape.

6. The harvesting device of claim 4, wherein:

said passageway has formed therein, at locations a functional distance from said peripheral lip, a plurality of cavities adapted for receiving a plurality of said ends of said flexible barrier members;

said plurality of flexible barrier members is arranged into a corresponding number of barrier bundles having two ends; and one end of each of said barrier bundles is fixedly attached within one each of said cavities.

7. The harvesting device of claim 1, wherein said apparatus further comprises:

handle means having two end sections, one of the end sections being rigidly attached to said conduit member, for allowing an operator of said harvesting device to position said receiving port about the stem of a desired harvest portion, by inserting said harvest portion into said passageway through said receiving port, such that a cross-section of the stem intersects the plane of said peripheral lip, at a distance from the hand of said operator.

8. The harvesting device of claim 7, wherein said handle means includes:

a substantially U-shaped member constructed of a material having sufficient resilience to allow the tips of said end sections to return to their original positions after having been urged together by an operator squeezing them together.

9. The harvesting device of claim 8, wherein said handle means further includes:

an attachment section having a surface adapted for attachment to said conduit member and a section in rigid connection with an end section of said U-shaped member.

10. The harvesting device of claim 9, wherein:

said end section of said U-shaped member not connected to said attachment section is fixedly attached to said severing means in a manner such that said severing means is in operational contact with said functional portion of said peripheral lip.

11. The harvesting device of claim 10, wherein:

said severing means is a blade member positioned in a manner and having an edge of a sufficient length to allow said edge to contact and sever a stem which intersects an area having a perimeter corresponding to the dimensions of said receiving port and lies in a plane substantially adjacent and parallel to the plane of said functional portion of said peripheral lip, when said tips of said end sections are urged toward one another by said operator.

12. The vegetable harvesting device of claim 11, further comprising:

hopper means having a holding cavity formed therein and in operational connection with said discharge port, for receiving and holding a plurality of said harvested harvest portions during the harvesting operation; and, wherein said conduit member is adapted for attachment to said hopper means.

13. The vegetable harvesting device of claim 12, wherein:

said passageway formed within said conduit member is substantially L-shaped and said receiving and discharge ports are located at the terminal ends thereof.

14. The vegetable harvesting device of claim 13, wherein:

said receiving port is located at the terminal end of the shorter length section of said L-shaped passageway.

15. The vegetable harvesting device of claim 2, wherein:

said conduit member is further provided with means for allowing said operator to see at least a part of said harvest portion connected to the stem when said harvest portion is within said passageway.

16. The vegetable harvesting device of claim 15, wherein:

said conduit member is constructed of a transparent material.

17. The vegetable harvesting device of claim 16, wherein:

said transparent material is a plastic.

18. A vegetable harvesting device for harvesting a harvest portion from a plant having a harvest portion supported at the end of a stem, such as okra and the like, said device comprising:

a conduit member including a passageway having receiving and discharge ports therein; said passageway being adapted to allow passage therethrough of a desired harvest portion and to receive a portion of the stem adjacent the harvest portion; the perimeter of said receiving port being defined by a peripheral lip located at a surface of said conduit member having at least a functional portion lying within a plane;

severing means, in operational connection with said functional portion of said peripheral lip and selectively responsive to an operator, for harvesting the harvest portion by severing the stem while a section of the stem is received within said passageway of said conduit member; and flexible barrier means, comprising brush bristles, disposed within said receiving port an operational distance from said peripheral lip, for allowing entrance of the harvest portion into said passageway when said harvest portion is supported by the stem and for preventing the harvest portion from exiting said passageway under the force of gravity through said receiving port after the harvest portion has been harvested from the plant by severing the stem.

19. A method of harvesting a harvest portion from a plant having a harvest portion supported at the end of a stein, such as okra and the like, comprising the following steps:

a) inserting a conduit member, which has at a proximal part an entrance port with flexible entry cover means operationally deflectable by a harvest portion supported on a stem but not operationally deflectable by the weight of a harvest portion, generally directed in a downward direction over the harvest portion with the harvest portion going through the entrance port and using the harvest portion to push aside the flexible entry cover means until at least a substantial amount of the harvest portion is within the conduit member;

b) actuating a laterally moveable knife to move across the width of the entrance port severing the stem below the harvest portion, severing the harvest portion from the stem, and using the flexible entry cover means to prevent the severed harvest portion from falling back out through the entrance port;

c) flipping the previously downwardly directed conduit member up and back, causing the severed harvest portion to be ejected out the distal part of the conduit member; and d) allowing the severed harvest portion to move through the conduit means to a distal part to be collected for removal of the severed harvest portion from the field.

20. The harvesting method of claim 19, wherein said laterally moveable knife has a handle and wherein there is included the further step of:

squeezing the handle causing the knife to move laterally across the width of the entrance port.

21. The harvesting method of claim 20, wherein said laterally moveable knife has a "U" shaped handle with the moveable knife being on one of the arms of the "U" shape, and wherein there is included the further step of:

the operator grasping the "U" shaped portion of the handle and squeezing the arms of the "U" shape together, causing the knife to move laterally across the width of the entrance port.

22. The harvesting method of claim 19, wherein said flexible entry cover means comprises a series of juxtaposed sets of brush bristles, and wherein there is further included the step of:

forcing the harvest portion on the stem through the brush bristles until the base of the harvest portion is past the brush bristles and then severing the stem with the knife.

23. A method of harvesting a harvest portion from a plant having a harvest portion supported at the end of a stem, such as okra and the like, comprising the following steps:

a) inserting a conduit member, which has at a proximal part an entrance port with flexible entry cover means, over the harvest portion with the harvest portion going through the entrance port using the harvest portion to push aside the flexible entry cover means until at least a substantial amount of the harvest portion is within the conduit member;

b) actuating a laterally moveable knife to move across the width of the entrance port severing the stem below the harvest portion, severing the harvest portion from the stem, and using the flexible entry cover means to prevent the severed harvest portion from falling back out through the entrance port;

c) flipping the conduit member up and back, causing the severed harvest portion to be ejected out the distal part of the conduit member; and d) allowing the severed harvest portion to move through the conduit means to a distal part to be collected for removal of the severed harvest portion from the field.

* * * * *